United States Patent
Britton et al.

(10) Patent No.: US 11,035,992 B1
(45) Date of Patent: Jun. 15, 2021

(54) SYSTEM AND METHOD FOR LIMITING THE EFFECTIVE COHERENCE LENGTH OF A SOLID-STATE LASER IN HOLOGRAPHIC RECORDING

(71) Applicant: Kaiser Optical Systems Inc., Ann Arbor, MI (US)

(72) Inventors: Timothy J. Britton, Ypsilanti, MI (US); James M. Tedesco, Livonia, MI (US)

(73) Assignee: Kaiser Optical Systems Inc., Ann Arbor, MI (US)

( * ) Notice: Subject to any disclaimer, the term of this patent is extended or adjusted under 35 U.S.C. 154(b) by 204 days.

(21) Appl. No.: 16/263,298

(22) Filed: Jan. 31, 2019

(51) Int. Cl.
*G02B 5/32* (2006.01)
*G03H 1/04* (2006.01)
*G02B 27/01* (2006.01)

(52) U.S. Cl.
CPC ........... *G02B 5/32* (2013.01); *G02B 27/0103* (2013.01); *G03H 1/0486* (2013.01); *G02B 2027/0109* (2013.01)

(58) Field of Classification Search
CPC .. G03H 1/0486; G03H 1/04; G03H 2001/026; G02B 27/0103; G02B 2027/0109; G02B 5/32
USPC ........................................................ 359/15
See application file for complete search history.

(56) References Cited

U.S. PATENT DOCUMENTS

| | | | |
|---|---|---|---|
| 4,458,978 A | 7/1984 | Arns et al. | |
| 4,530,564 A | 7/1985 | Close | |
| 5,071,208 A | 12/1991 | Chang | |
| 5,124,815 A | 6/1992 | Chang | |
| 2007/0019692 A1 | 1/2007 | Kogure | |
| 2010/0054286 A1* | 3/2010 | Gladding | H01S 3/1305 372/21 |

FOREIGN PATENT DOCUMENTS

| | | |
|---|---|---|
| CN | 2748950 Y | 12/2005 |
| CN | 102436168 A | 5/2012 |
| CN | 107923794 A | 4/2018 |
| CN | 108027229 A | 5/2018 |
| CN | 108415110 A | 8/2018 |

* cited by examiner

Primary Examiner — Kristina M Deherrera
(74) Attorney, Agent, or Firm — Mark A. Logan; Endress+Hauser (USA) Holding Inc.

(57) ABSTRACT

The effective coherence length of a single-frequency, solid-state laser is limited to reduce spurious, secondary holograms in conjunction with a holographic recording. The wavelength of the laser is varied or 'scanned' with high precision over a very small wavelength range. In an embodiment, the temperature of the laser's resonant cavity optical bench is altered, causing the dimension of the cavity to change and the emission wavelength to move in a controlled manner. The changing wavelength is monitored at high resolution, and a feedback control loop updates the temperature set-point to keep the monitored laser wavelength moving at a desired rate of change through a desired range. As the wavelength of the laser is scanned, the phase of the holographic interference pattern is locked at a position of maximum coherence/contrast within the holographic film aperture.

27 Claims, 2 Drawing Sheets

SYSTEM AND METHOD FOR LIMITING THE EFFECTIVE COHERENCE LENGTH OF A SOLID-STATE LASER IN HOLOGRAPHIC RECORDING

TECHNICAL FIELD

This present disclosure relates generally to holographic optical elements and, more particularly, to an apparatus and methods for controlling the effective coherence length of a single-frequency, solid-state laser in conjunction with a holographic optical element exposure.

BACKGROUND

The coherence length of a laser is a measure the propagation length of the laser's beam over which coherence degrades significantly. For purposes of holographic recording, a laser beam is split along two paths and recombined to form an interference pattern in a holographic film. If the beam splitter divides the beam power equally, and the two optical path lengths after the beam splitter are exactly equal, fringes of 100 percent contrast will be formed at the holographic film. If the two path lengths are unequal by more than the coherence length, the interference fringe contrast degrades significantly. In the example of an F15E dual-beam holographic combiner, the path length difference between the two interfering beams changes by approximately +/−20 mm throughout the hologram aperture relative to a midpoint. Furthermore, the midpoint does not appear at the exact center of the hologram aperture.

An efficient hologram over the full hologram aperture requires a high contrast holographic interference pattern across the full aperture. In the case of the F15E combiner, the full aperture is approximately 13 inches. Thus, a coherence length greater than 20 mm is needed, with a path length of the two beams equalized at a point near the "zero" contour of the relative path length map.

Large-aperture holographic optical elements, particularly those generated by interfering two differently shaped beams to form interference fringe surfaces that are not conformal to the substrate on which they are recorded, have typically used Argon-ion gas (Ar) lasers. The F15E holographic head-up display (HUD) combiner is one such product.

The benefits of Ar lasers include high power and potentially very long coherence length, the latter being enabled by an internal Fabry-Perot etalon that selects a single frequency from among the many otherwise available within the gain curve of the laser tube.

However, dual-beam holograms exposed using a laser of very long coherence length are susceptible to the recording of secondary holograms caused by the exposure beams reflecting from the external glass-air interfaces of the substrate and cover-plate that surround the photosensitive holographic film. Such secondary holograms can generate undesirable artifacts in the image of the HUD, including secondary "ghost" images of the collimated image source, and/or transmission gratings that generate distracting "rainbows" surrounding bright external light sources such as, say, bright landing strip lights against a dark, nighttime background.

The magnitude of these secondary holograms, and the brightness of the undesirable image artifacts that they produce, can be reduced by limiting the coherence length of the laser. Ideally, the coherence length would be limited to just that necessary to generate a sufficiently efficient primary hologram, but no longer. As such, the additional path length differences introduced in the round-trip of each beam between the holographic film and the exterior air/glass interface reflections back to the film will exceed the coherence length of the laser, and the resulting secondary interference patterns that they generate at the film will be of reduced contrast. The resulting secondary holograms are thereby less efficient, reducing the brightness of the display artifact.

The most significant secondary holograms are formed by reflections of each beam from the external glass/air interfaces. The intensity of these reflections is reduced with the aid of antireflection coatings, which in turn reduces the intensity and contrast of the secondary fringe patterns. Nevertheless, these secondary holograms can still generate distracting artifacts in a HUD image, particularly against a dark, nighttime background. Because these reflections undergo additional optical path length before returning to the holographic film (e.g., approximately 30 mm from the thinner substrate and 120 mm from the thicker exposure coverplate), the secondary hologram intensity/contrast may be reduced further by minimizing the coherence length to just that necessary to record the primary hologram.

While there is no known method of "setting" a particular coherence length on a laser, it has been discovered empirically that when the etalon of a typical large frame, high-power Argon ion laser is removed altogether, the resulting longitudinal mode structure yields a coherence length that enables an efficient primary hologram and significantly reduced (but not eliminated) secondary holograms.

Another prior art method of reducing secondary hologram fringe contrast in a dual-beam hologram is disclosed in U.S. Pat. Nos. 4,458,978 and 4,530,564. According to these references, the second beam is formed by a stationary free-form mirror (dominantly toroidal), the space between the film and the mirror is filled with an index-matching fluid, and a separate coverplate between the first beam and the film is intentionally moved with respect to the film throughout the exposure by piezo-electric transducers.

In the above "dual-beam" examples, the coherence length required is on the order of tens of millimeters. Another class of holographic optical element is one in which the holographic fringes are "conformal," that is, the second beam is formed by a reflection of the first beam at the surface of the holographic film, either from a mirror index-matched to the film, or from the film/air interface. The fringe planes are formed by such a reflection "conform" to the film/reflector surface. In this case, the coherence length necessary to form an efficient primary hologram is only on the order of the holographic film depth, typically no more than tens of microns—three orders of magnitude less than the F15 HUD combiner example referred to above. These are sometimes referred to as "single beam" or "conformal" holograms. Effective coherence can be reduced to desired levels in a relatively simple manner via controlled motion of the film plate with respect to the single exposure beam, or with the introduction of a moving diffuser in the exposure beam. U.S. Pat. No. 5,124,815 teaches such a moving (e.g., rotating) ground glass method.

It is also known to reduce effective coherence length by tuning the wavelength of the laser, in particular a tunable dye laser. This is described in U.S. Pat. No. 5,071,208. This method was not reduced to practice due to practical limitations on available wavelength and power of such lasers, and the mechanisms by which they are tuned.

In recent years, solid-state lasers have become available at primary holographic exposure wavelengths (488 and 514 nm), and at power levels similar to Argon ion lasers (e.g., 2-4W). There is great motivation to transition away from Argon-ion lasers to solid-state lasers. Argon-ion lasers are much more expensive to buy, operate, and maintain, and they are extremely inefficient, requiring kilowatts of electricity at 440V to generate a couple watts of light. Modern solid-state lasers are compact and highly efficient, running off a standard wall outlet.

Since most of the Argon ion laser's electrical power is wasted as heat, the Argon ion laser requires a continuous and substantial flow of cooling water, more than can be provided with a practical recirculating chiller. The waste heat load on the equivalent solid-state laser is orders of magnitude smaller, compatible with either a small recirculating chiller or a heat sink fan. The mechanical vibration imparted to the holographic exposure table by the high flow rate of cooling water to the Argon ion laser presents a challenge to achieving the holographic fringe stability required of the entire exposure system, even with active fringe stabilization techniques. This can impact product yield. The solid-state laser introduces much less mechanical noise to the exposure table, especially when used with a small recirculating chiller instead of a fan.

Finally, Argon ion lasers have a more limited life. The laser tubes need frequent replacement, and the 440V power supplies need frequent repair. The equivalent solid-state laser has an expected lifetime much longer than that of an Argon ion laser tube, and costs less than a single laser tube replacement.

Modern, solid-state lasers are inherently single-frequency, long-coherence-length devices, but there is no known system or method to reduce coherence for large-aperture holographic exposures. Unlike Argon ion lasers, solid-state devices have no etalon that can be removed to limit the coherence without fundamentally changing the existing large and expensive exposure hardware infrastructure. As such, there is an outstanding need for a system and method to reduce, adjust and control the effective coherence length of a single-frequency, solid-state laser in a holographic optical element exposure.

SUMMARY

Certain aspects of the present disclosure are directed to a system and methods for controlling and limiting the effective coherence length of a single-frequency, solid-state laser to reduce or eliminate spurious, secondary holograms in conjunction with a holographic optical element exposure. To accomplish this, the wavelength of the laser is varied or "scanned" over a very small wavelength range, thereby reducing the effective coherence length of the laser to a desired value. The wavelength of the laser is controlled with high precision over a very small wavelength range. In at least one embodiment, the temperature of the laser's resonant cavity optical bench is altered during the exposure, causing the dimension of the cavity to change and thus changing the emission wavelength of the laser in a controlled manner. The changing emission wavelength is monitored at high resolution, and a feedback control loop updates the temperature set-point of the laser's resonant cavity optical bench to keep the monitored laser wavelength moving at a desired rate of change through a desired range.

As the wavelength of the laser is scanned during a holographic exposure, the phase of the holographic interference pattern is locked at a desired position of maximum coherence/contrast within the holographic film aperture. To facilitate this, an interferometer samples the two holographic exposure beams outside of the primary hologram aperture and deviates them along a common path to form an interference pattern. A detector monitors characteristics of the interference pattern and, as the laser wavelength is scanned, the detector signals are used in a feedback loop to drive piezoelectric transducers that add or subtract path length in one of the two exposure beams as necessary to keep the interference pattern phase locked at all wavelengths.

The path length difference between the two interfering beams is set to match the path length difference at the point in the primary hologram film aperture at which maximum fringe contrast is desired. This keeps the holographic fringe pattern also phase-locked at that same path-length-difference point, corresponding to the midpoint of the desired path-length difference content of the primary hologram being recorded, throughout the entire laser wavelength scan. The adjustable coherence length and position in space of the phase lock provide two degrees of freedom to optimize the trade-off between primary hologram performance and minimum secondary/spurious holograms.

The nominal emission wavelength of the laser is varied in accordance with a wavelength-time profile. This profile may be linear, stepped or curved/sinusoidal to produce similar effective coherence length control as integrated throughout the total exposure time. The number of cycles through the wavelength range may be arbitrary, as the objective is to spend a similar amount of exposure time at several wavelengths spread throughout the desired range. The present disclosure is ideally suited to large-aperture recordings such as those associated with head-up displays.

According to one aspect of the present disclosure, a method of exposing a holographic recording medium includes providing a solid-state laser configured to output a laser beam having a nominal emission wavelength; splitting the laser beam into first and second exposure beams to form a first interference fringe pattern having a phase in the recording medium during an exposure period; varying the nominal emission wavelength of the laser in accordance with a wavelength-time profile to reduce an effective coherence length of the laser as integrated over the exposure period; and maintaining the phase of the first interference fringe pattern at a position of maximum coherence or contrast while the recording medium is being exposed. The nominal emission wavelength of the laser may be varied by adjusting a wavelength-sensitive laser cavity component or parameter. The wavelength-sensitive laser cavity component or parameter may be a temperature set-point of a resonant cavity optical bench of the laser.

In certain embodiments, the method may further comprise monitoring the nominal emission wavelength using an interferometer; and updating the temperature set-point in accordance with the wavelength-time profile via a feedback control loop.

In certain embodiments, varying the nominal emission wavelength of the laser in accordance with a wavelength-time profile may include varying the nominal emission wavelength at a predetermined rate of change throughout the exposure period. In certain embodiments, varying the nominal emission wavelength of the laser in accordance with a wavelength-time profile may include varying the nominal emission wavelength continuously throughout the exposure period.

The method may include sampling the first and second exposure beams at or near the recording medium to determine the phase of the fringe pattern. The method may further include adjusting a path length of one of the first and second exposure beams in accordance with the determined phase to maximize the contrast of the fringe pattern.

In certain embodiments of the method, the nominal emission wavelength may varied over a spectral bandwidth of 100 picometers or less. The spectral bandwidth may be also in the range of about 1 to 20 picometers.

In certain embodiments of the method, the nominal emission wavelength may be controlled to within 10 picometers or less. The wavelength may be also controlled to within 0.1 picometer.

In certain embodiments of the method, the step of maintaining the phase of the first interference fringe pattern at a position of maximum coherence or contrast may include sampling the first and second exposure beams at or near the recording medium to determine the position of maximum coherence or contrast; and adjusting a path length of one of the first and second exposure beams to maintain the phase of the first interference fringe pattern at the position of maximum coherence or contrast as the nominal emission wavelength is varied.

The method may include deviating the first and second exposure beams along a common path from the recording medium to form a second interference fringe pattern; and detecting a peak, a null, or an edge of a fringe in the second interference fringe pattern In some embodiments of the method, the recording medium may define an aperture of 100 square inches or more. The recording medium may form a head-up display.

According to another aspect of the present disclosure, a system for exposing a holographic recording medium includes a solid-state laser configured to output a laser beam having a nominal emission wavelength; a first beam splitter for splitting the laser beam into first and second exposure beams to form a first interference fringe pattern having a phase in the recording medium during an exposure period; an apparatus for varying the nominal emission wavelength of the laser in accordance with a wavelength-time profile to reduce the effective coherence length of the laser as integrated over the exposure period; and an apparatus for maintaining the phase of the first interference fringe pattern at a position of maximum coherence or contrast while the recording medium is being exposed. The apparatus for varying the nominal emission wavelength of the laser may include a feedback loop including a wavelength monitor coupled to a device configured to adjust a wavelength-sensitive laser cavity component or parameter. The device configured to adjust a wavelength-sensitive laser cavity component or parameter may be configured to adjust a temperature set-point of a resonant cavity optical bench of the laser.

In certain embodiments of the system, the wavelength monitor may be an interferometer. The apparatus for maintaining the phase of the first interference fringe pattern at a position of maximum coherence or contrast may include a device for deviating the two exposure beams along a common path from the recording medium to form a second interference pattern; a device for detecting a peak, null, or edge of a fringe in the second interference pattern; and a device for adjusting the path length of one of the first and second exposure beams to maintain the phase of the first interference fringe pattern at the position of maximum coherence or contrast. The device for deviating the first and second exposure beams along a common path from the recording medium may include a conformal beam splitter coating on the recording medium. The device for deviating the first and second exposure beams along a common path from the recording medium may include a second beam splitter component. The device for detecting a peak, null, or edge of a fringe in the second interference pattern may be an interferometer. The device for adjusting the path length of one of the first and second exposure beams to maintain the phase of the first interference fringe pattern may include a piezoelectric transducer inserted into one of the first and second exposure beams.

In certain embodiments of the system, the apparatus for varying the nominal emission wavelength may be operative to vary a spectral bandwidth of the laser by 100 picometers or less. The apparatus for varying the nominal emission wavelength may operative to vary a spectral bandwidth of the laser in a range of about 1 to 20 picometers. The apparatus for varying the nominal emission wavelength may be operative to control the nominal emission wavelength to within 10 picometers or less. The apparatus for varying the nominal emission wavelength may operative to control the nominal emission wavelength to within 0.1 picometer.

In certain embodiments of the system, the recording medium defines an aperture of 100 square inches or more. The recording medium may form a head-up display.

According to another aspect of the present disclosure, a two-beam holographic recording system using a solid-state laser outputting a nominal emission wavelength, includes an improvement comprising controlling a temperature set-point of the laser to vary the nominal emission wavelength, thereby reducing an effective coherence length of the laser, while simultaneously maximizing a contrast of a recorded interference pattern.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

In accordance with the present disclosure, the wavelength of a single-longitudinal-mode (SLM) solid-state laser is varied or 'scanned' over a very small wavelength range, thereby reducing the effective coherence length of the laser to a desired value, as integrated over an extended time period, for purposes of reducing or eliminating spurious/secondary holograms in a holographic exposure. In scanning the wavelength of the laser during a holographic exposure, which scan may be several minutes long, the effective coherence length of the exposure is related to the wavelength content of the exposure by the following relationship:

$$L_{coh} = c/\pi \Delta v = \lambda 2/\pi \Delta \lambda \qquad \text{(EQN. 1)}$$

Where: $L_{coh}$ is a coherence length;
c is the speed of light;
$\Delta v$ is a spectral frequency bandwidth;
$\lambda$ is a nominal wavelength of the laser exposure; and
$\Delta \lambda$ is a spectral wavelength bandwidth.

In EQN. 1, the coherence length is defined as the propagation length after which the magnitude of the coherence function has dropped to the value of 1/e for a Lorentzian bandwidth distribution. As such, the coherence length is an approximation relative to what one might expect from a linear time-scanned laser wavelength at constant intensity. But as a good first approximation, EQN. 1 indicates that, for example, a coherence length of 20 mm at a nominal 514.5 nm wavelength would be generated by a wavelength scan of approximately 0.004 nm (or 4 picometers). An optimum balance between efficient primary and inefficient secondary holograms for the F15E exposure, for example, will fall somewhere in this order of magnitude. It was discovered experimentally that a good balance occurs at an actual wavelength scan width of approximately 8 picometers.

Figure 1:
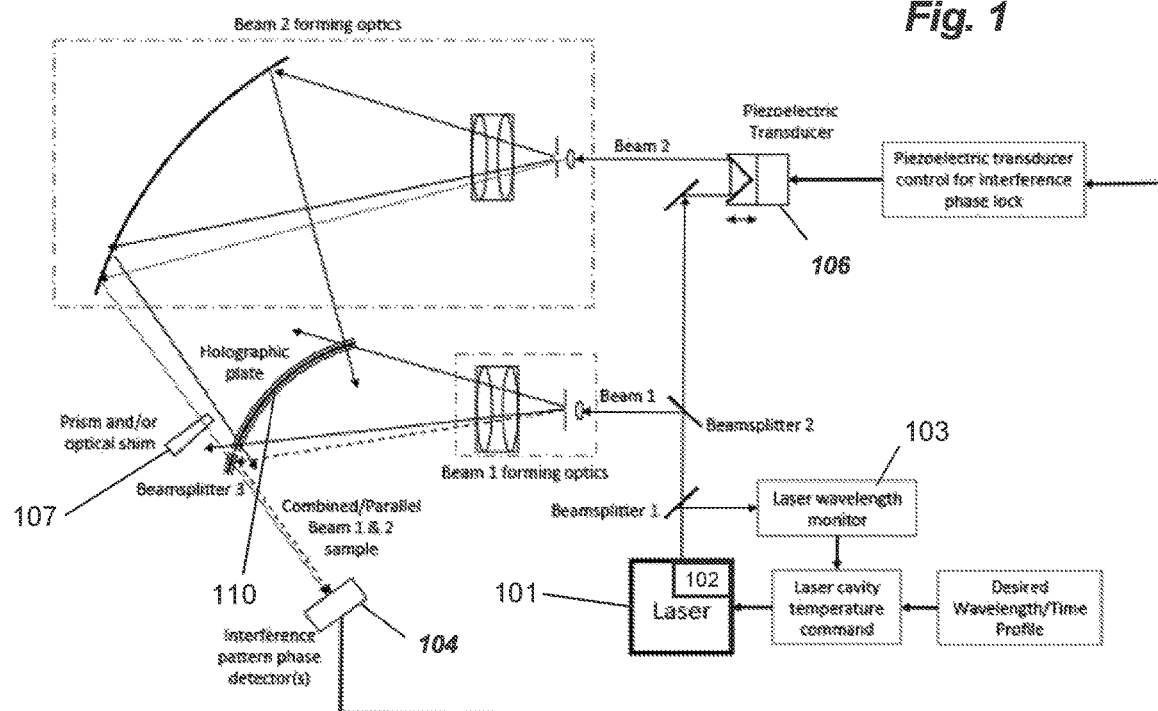
FIG. 1 is a schematic diagram illustrating holographic exposure and controls according to the present disclosure.

FIG. 1 is a schematic diagram illustrating a system 100 for holographic exposure and controls according to the present disclosure. In an embodiment according to the present disclosure, the system 100 may include a laser 101 having a laser emission wavelength. The laser 101 may be a single-longitudinal-mode solid-state laser such as an optically pumped semiconductor laser. In accordance with the present disclosure, the emission wavelength of the laser is controlled with high precision (e.g., on the order of 0.1 picometer) over a very small desired wavelength range (e.g., on the order of 1-20 picometers). The system reduces the effective coherence length of the laser to a desired value, as integrated over an extended time period, for purposes of reducing or eliminating spurious/secondary holograms in a holographic exposure.

The emission wavelength may be moved by adjusting a critical wavelength-sensitive laser cavity component of the laser 101. In at least one embodiment, a temperature set-point of the resonant cavity optical bench 102 within the laser 101 is varied in increments on the order of 0.1° C. The system 100 may control the temperature set-point of the resonant cavity optical bench 102 within the laser 101 by accessing control parameters of the laser 101. Varying the temperature of the resonant cavity optical bench 102 in the laser 101 causes the dimension of the cavity to change and the emission wavelength to move accordingly in a continuous manner.

Figure 2:
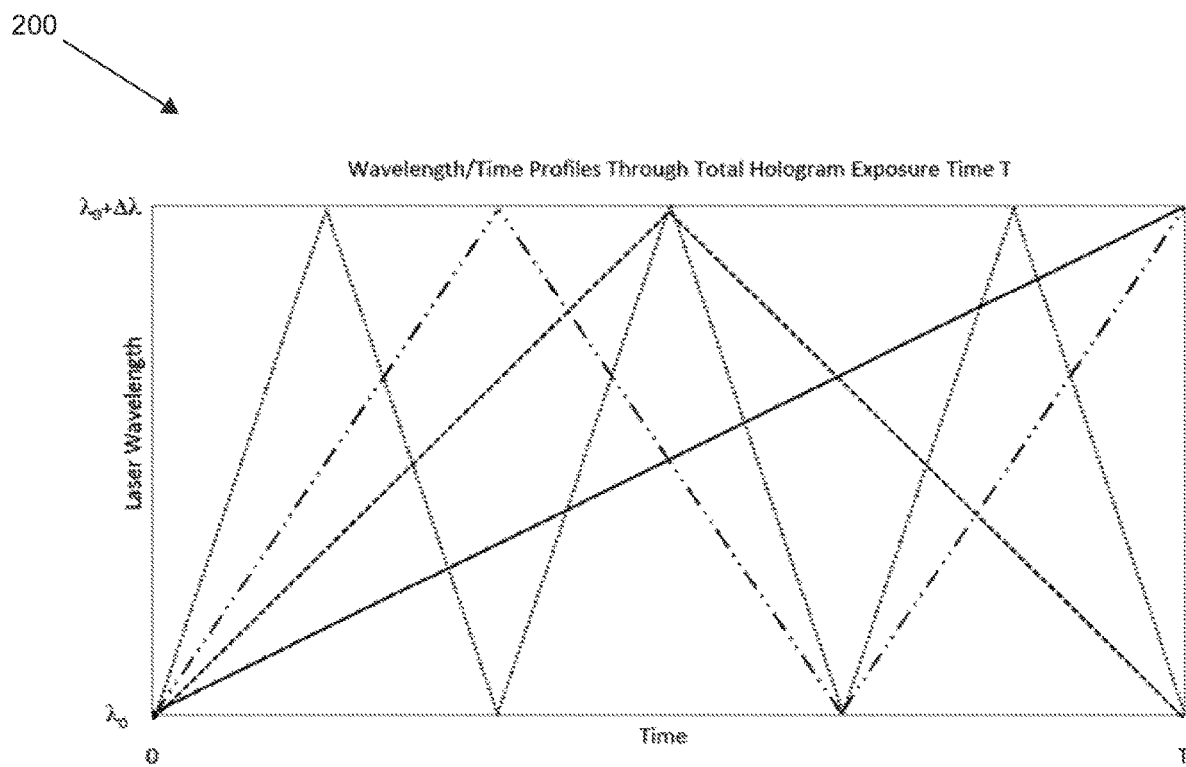
FIG. 2 illustrates wavelength-time profiles according to the present disclosure.

The emission wavelength is monitored at high resolution, for example, with a scanning interferometer 103. In certain embodiments, the interferometer 103 may be a Fabry-Perot interferometer. A feedback control loop may be used to update a temperature set-point maintained by the laser 101 of the resonant cavity optical bench 102 to keep the monitored emission wavelength moving at a desired rate of change through the desired wavelength range. In certain embodiments, the feedback control loop may reverse the temperature change direction to keep the emission wavelength alternating between the boundaries of the desired wavelength range with a desired profile. FIG. 2, discussed further herein, illustrates exemplary wavelength-time profiles.

As the wavelength of the laser 101 is scanned during a holographic exposure, a technique is used to keep the phase of the holographic interference pattern locked at the desired position of maximum coherence/contrast within a holographic film aperture 110. To facilitate keeping the holographic interference pattern locked at the desired position, an additional interferometer 104 may sample holographic exposure beam 1 and holographic exposure beam 2 outside of the primary hologram aperture 110, and deviate them along a common path to form an interference pattern at the interferometer 104. Detectors in the interferometer 104 may monitor a peak and a null in this interference pattern. Note that interferometer 104 may be a generic phase-sensing system, typically detecting one or more of a peak, null, or edge of a fringe in the interferometer fringe pattern formed by beam splitter 3 combining exposure beams 1 and 2. This fringe pattern may take the nominal form of linear, concentric (e.g., "bull's-eye"), elliptical or saddle/hyperbolic fringes, depending on the relative wavefront shapes of beams 1 and 2 and their degree of parallelism after beam splitter 3. Note, further, that in practice beam splitter 3 may be a separate physical component, or a conformal beam splitter coating on the hologram exposure plate (as shown in FIG. 1).

A piezo-electric transducer 106 may change the path length of exposure beam 2 as necessary in order to keep the fringe pattern phase locked (stationary) as the laser emission wavelength changes. The prism and/or optical shim 107 may be implemented in different ways, as separate devices, or as a single component. The prism function of the prism and/or optical shim 107 may deviate one beam angle (via the prism angle of the prism and/or optical shim 107), as necessary, to be nominally parallel to the other beam after beams 1 and 2 are combined by beam splitter 3.

The optical shim function of the prism and/or optical shim 107 may add optical path length (via the thickness of the prism and/or optical shim 107) to one of the beams, as necessary, such that the path length difference of beam 1 and beam 2, as measured between beam splitter 1 and beam splitter 3, is identical to that at the desired position of maximum fringe contrast within the hologram active area, which may or may not be near the physical center. The shim function is therefore more critical, as the prism is a steering optic. Note, further, that the optical path tuning accomplished by the optical shim of the prism and/or optical shim 107, and/or the beam deviation accomplished by the prism of the prism and/or optical shim 107, may be implemented with reflective optics, for example, by adding a jog-out-and-back path on one beam to correct its path length, or a combination jog-and-angle-change using a series of mirrors to accomplish the same function(s).

As the laser wavelength is scanned, the detector signals from the interferometer 104 may be used in a feedback loop to drive the piezoelectric transducer 106 to add or subtract path length in one of the two exposure beams as necessary to keep the interference pattern phase locked at all wavelengths. The path length difference between the two interfering beams may be set to match the path length difference at the point in the primary hologram film aperture 110 at which maximum fringe contrast is desired. This keeps the holographic fringe pattern also phase-locked at the same path-length-difference point, corresponding to the midpoint of the desired path-length difference content of the primary hologram being recorded, throughout the entire laser wavelength scan.

The adjustable coherence length and position in space of the phase lock provide two degrees of freedom to optimize the tradeoff between primary hologram performance and minimum secondary/spurious holograms.

FIG. 2 includes a graph 200 illustrating four wavelength-time profiles according to the present disclosure. The graph 200 shows four possible profiles through the total exposure time T. $\lambda_0$ is the nominal wavelength of the laser exposure, and $\Delta\lambda$ is the spectral wavelength bandwidth. Though FIG. 2 illustrates ramp and sawtooth profiles, the wavelength-time profiles need not be linear. Other possible wavelength-time profiles include stepped or curved/sinusoidal to produce similar effective coherence length as integrated throughout the total exposure time. The number of cycles through the wavelength range is also arbitrary, as the objective is to spend a similar amount of exposure time at several wavelengths spread throughout the desired range.

While the present disclosure has been described with respect to reflection holograms, the same coherence and secondary holograms formed by glass-air reflections, and the solutions described herein, apply equally well to transmission holograms, including those used in Raman and astronomical spectroscopic gratings (wherein the recording beams arrive from the same side of the film).

Further, while the beam-forming optics accommodate the recording of a curved plate, flat and other recording element geometries are anticipated. While the present disclosure is well suited to large-aperture holograms of the type suited to head-up displays, informational combiners, large-format scientific and astronomical gratings having apertures of 100 square inches and more, the present disclosure is not limited in terms of hologram size. Nor is the present disclosure limited in terms of holographic recording media, which may include dichromated gelatin, photo emulsions and resists, polymers, thermoplastics and refractives.

While various embodiments of a holographic recording system and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and thus remain within the scope of the present disclosure.

The invention claimed is:

1. A method of exposing a holographic recording medium, comprising the steps of:
    providing a solid-state laser configured to output a laser beam having a nominal emission wavelength;
    splitting the laser beam into first and second exposure beams to form a first interference fringe pattern having a phase in the recording medium during an exposure period;
    varying the nominal emission wavelength of the laser in accordance with a wavelength-time profile to reduce an effective coherence length of the laser as integrated over the exposure period; and
    maintaining the phase of the first interference fringe pattern at a position of maximum coherence or contrast while the recording medium is being exposed.

2. The method of claim 1, wherein the nominal emission wavelength of the laser is varied by adjusting a wavelength-sensitive laser cavity component or parameter.

3. The method of claim 2, wherein the wavelength-sensitive laser cavity component or parameter is a temperature set-point of a resonant cavity optical bench of the laser.

4. The method of claim 3, further comprising:
    monitoring the nominal emission wavelength using an interferometer; and
    updating the temperature set-point in accordance with the wavelength-time profile via a feedback control loop.

5. The method of claim 1, wherein varying the nominal emission wavelength of the laser in accordance with a wavelength-time profile includes varying the nominal emission wavelength at a predetermined rate of change throughout the exposure period.

6. The method of claim 1, wherein varying the nominal emission wavelength of the laser in accordance with a wavelength-time profile includes varying the nominal emission wavelength continuously throughout the exposure period.

7. The method of claim 1, further comprising:
    sampling the first and second exposure beams at or near the recording medium to determine the phase of the fringe pattern.

8. The method of claim 7, further comprising:
    adjusting a path length of one of the first and second exposure beams in accordance with the determined phase to maximize the contrast of the fringe pattern.

9. The method of claim 1, wherein the nominal emission wavelength is varied over a spectral bandwidth of 100 picometers or less.

10. The method of claim 9, wherein the spectral bandwidth is in the range of about 1 to 20 picometers.

11. The method of claim 1, wherein the nominal emission wavelength is controlled to within 10 picometers or less.

12. The method of claim 1, wherein the nominal emission wavelength is controlled to within 0.1 picometer.

13. The method of claim 1, wherein the step of maintaining the phase of the first interference fringe pattern at a position of maximum coherence or contrast includes:
    sampling the first and second exposure beams at or near the recording medium to determine the position of maximum coherence or contrast; and
    adjusting a path length of one of the first and second exposure beams to maintain the phase of the first interference fringe pattern at the position of maximum coherence or contrast as the nominal emission wavelength is varied.

14. The method of claim 13, further comprising:
    deviating the first and second exposure beams along a common path from the recording medium to form a second interference fringe pattern; and
    detecting a peak, a null, or an edge of a fringe in the second interference fringe pattern.

15. The method of claim 1, wherein the recording medium defines an aperture of 100 square inches or more.

16. The method of claim 1, wherein the recording medium forms a head-up display.

17. A system for exposing a holographic recording medium, comprising:
    a solid-state laser configured to output a laser beam having a nominal emission wavelength, wherein the laser includes a resonant cavity optical bench and further includes a means to control a temperature set-point of the resonant cavity optical bench, wherein the laser is configured to enable varying the temperature set-point of the resonant cavity optical bench thereby varying the nominal emission wavelength of the laser in accordance with a wavelength-time profile to reduce the effective coherence length of the laser as integrated over the exposure period;
    a first beam splitter for splitting the laser beam into first and second exposure beams to form a first interference fringe pattern having a phase in the recording medium during an exposure period;
    a second beam splitter disposed in an optical path of the first exposure beam and in an optical path of the second exposure beam, wherein the second beam splitter is configured to deviate the two exposure beams along a common path from the recording medium to form a second interference pattern;

a device for detecting a peak, a null, or an edge of a fringe in the second interference pattern; and a piezo-electric transducer disposed on the optical path of the second exposure beam, wherein the piezo-electric transducer is controlled by a feedback loop from the device for detecting a peak, a null, or an edge of a fringe in the second interference pattern, and wherein the piezoelectric transducer is controlled to adjust a path length of the second optical path to maintain fixed in space the peak, the null, or the edge of the fringe in the second interference pattern while the recording medium is being exposed.

18. The system of claim 17, further comprising:
a wavelength monitor including a feedback loop, wherein the wavelength monitor is configured to monitor the nominal emission wavelength of the laser and the feedback loop is configured to provide the monitored nominal emission wavelength.

19. The system of claim 18, wherein the wavelength monitor is an interferometer.

20. The system of claim 17, further comprising:
a prism or an optical shim disposed in the optical path of the first exposure beam or in the optical path of the second exposure beam whereby the prism or the optical shim is configured to set a location of maximum fringe contrast in the second interference pattern.

21. The system of claim 17, wherein the second beam splitter includes a conformal beam splitter coating on the recording medium.

22. The system of claim 17, wherein the device for detecting a peak, null, or edge of a fringe in the second interference pattern is an interferometer.

23. The system of claim 17, wherein the laser is configured to vary the nominal emission wavelength of the laser over a range of 100 picometers or less.

24. The system of claim 17, wherein the laser is configured to vary the nominal emission wavelength over a range of about 1 to 20 picometers.

25. The system of claim 17, wherein the laser is configured to vary the nominal emission wavelength over a range of 10 picometers or less.

26. The system of claim 17, wherein the laser is configured to control the nominal emission wavelength to within a resolution of 0.1 picometer.

27. The system of claim 17, wherein the recording medium defines an aperture of 100 square inches or more.

* * * * *